(12) United States Patent
Bertram et al.

(10) Patent No.: US 7,168,879 B2
(45) Date of Patent: Jan. 30, 2007

(54) PLUG-IN COUPLING ALLOWING FOR COMPENSATING MOVEMENTS

(75) Inventors: Andreas Bertram, Bad Salzuflen (DE); Rainer Süssenbach, Steinhagen (DE)

(73) Assignee: Bollhoff GmbH, Bielefeld (DE)

( * ) Notice: Subject to any disclaimer, the term of this patent is extended or adjusted under 35 U.S.C. 154(b) by 119 days.

(21) Appl. No.: 10/447,084

(22) Filed: May 28, 2003

(65) Prior Publication Data

US 2004/0086324 A1    May 6, 2004

(30) Foreign Application Priority Data

Oct. 31, 2002   (DE) ............................ 202 16 836 U

(51) Int. Cl.
*F16C 11/00* (2006.01)
*F16B 21/07* (2006.01)

(52) U.S. Cl. ..................... 403/135; 403/50; 403/51; 403/132; 403/133

(58) Field of Classification Search .............. 403/122, 403/132, 134, 135, 140, 142, 143, 50, 51, 403/133; 24/662, 683, 685; 248/496, 288.31; 74/473.29; 220/691

See application file for complete search history.

(56) References Cited

U.S. PATENT DOCUMENTS

| | | | | |
|---|---|---|---|---|
| 2,754,141 A | * | 7/1956 | Latzen ........................ 403/51 |
| 3,290,073 A | * | 12/1966 | Gottschald .................. 403/124 |
| 3,389,926 A | * | 6/1968 | Gottschald .................... 403/51 |
| 3,591,192 A | * | 7/1971 | Sharp et al. ................. 403/134 |
| 3,916,756 A | * | 11/1975 | Yoda ............................. 24/683 |
| 4,069,617 A | * | 1/1978 | Koike ........................... 49/428 |
| 4,326,307 A | * | 4/1982 | Baillie et al. ................. 24/630 |
| 4,778,320 A | * | 10/1988 | Nakama ....................... 24/662 |
| 5,120,151 A | * | 6/1992 | Farris et al. ................. 403/24 |
| 5,297,322 A | * | 3/1994 | Kraus ........................... 24/662 |
| 5,329,677 A | * | 7/1994 | Kanzaka ....................... 24/662 |
| 5,580,204 A | * | 12/1996 | Hultman ............... 403/DIG. 11 |
| 5,647,713 A | * | 7/1997 | Ge et al. ....................... 24/662 |
| 5,653,548 A | * | 8/1997 | Amdahl ...................... 403/133 |
| 5,771,234 A | * | 6/1998 | Wu et al. .................... 370/396 |
| 6,113,302 A | * | 9/2000 | Buhl .......................... 403/135 |

(Continued)

FOREIGN PATENT DOCUMENTS

GB        2352492 A   *   1/2001

(Continued)

*Primary Examiner*—Daniel P. Stodola
*Assistant Examiner*—Ernesto Garcia
(74) *Attorney, Agent, or Firm*—Seyfarth Shaw LLP

(57) ABSTRACT

A plug-in coupling for removably interconnecting a first structural member and a second structural member comprises a resiliently deformable female coupling part adapted to be inserted into a socket at the first structural member such that it is retained therein. The female coupling part comprises a ball-shaped cup, an intermediate annular wall integral with said ball-shaped cup and serving as a guide portion, and a tubular external wall integral with said annular intermediate wall. The external wall surrounds at least a part of the ball-shaped cup in spaced relation thereto and engages a peripheral wall of the socket when the female coupling part is inserted into the socket. A male coupling part comprises a ball-shaped head and a fixing portion for securing the male coupling part to the second structural member. The intermediate annular wall of the female coupling part is of an undulated shape at least in a certain area thereof.

16 Claims, 3 Drawing Sheets

U.S. PATENT DOCUMENTS

| | | | |
|---|---|---|---|
| 6,206,604 B1 * | 3/2001 | Dembowsky et al. | 403/122 |
| 6,276,652 B1 | 8/2001 | Rieger | |
| 6,374,468 B1 * | 4/2002 | Cardwell et al. | 24/662 |
| 6,817,337 B1 * | 11/2004 | Siring et al. | 403/122 |

FOREIGN PATENT DOCUMENTS

| | | | |
|---|---|---|---|
| JP | 62297525 A | * | 12/1987 |
| JP | 02051614 A | * | 2/1990 |

* cited by examiner

PLUG-IN COUPLING ALLOWING FOR COMPENSATING MOVEMENTS

BACKGROUND OF THE INVENTION

The present invention relates to a plug-in coupling for removably inter-connecting a first structural member and a second structural member.

Applicant's U.S. Pat. No. 6,206,604 B1 discloses a plug-in coupling comprising a resiliently deformable female coupling part and a male coupling part. The female coupling part is adapted to be inserted into a socket provided at the first structural member such that it is positively retained therein. It comprises a ball-shaped cup, a tubular external wall, and an intermediate annular wall therebetween. The tubular external wall surrounds the ball-shaped cup in spaced relationship thereto and comes into engagement with a peripheral wall of the socket when the female coupling part is inserted into the socket. The male coupling part comprises a ball-shaped head and a fixing portion adapted to be secured to the second structural member.

In this plug-in coupling of the prior art, the intermediate annular wall of the female coupling part, which serves as an insertion guide portion, is of conical shape and is stiffened by webs extending along secants between the tubular external wall of the female coupling part and being connected to the external surface of the ball-shaped cup by radial ribs. The female coupling part is made of thermoplastic elastomeric or rubber material.

This prior art plug-in coupling, which has proven to be very successful in the market, has vibration damping characteristics due to its geometry and the used material so that it provides for vibrational decoupling of the two structural members. However, vibrational decoupling relative movements between the two structural members are limited to directions transverse to the longitudinal axis of the plug-in coupling because the plug-in coupling is relatively stiff in an axial direction due to the above mentioned webs. Use of relatively soft thermoplastic elastomeric or rubber material furthermore suffers from certain drawbacks such as e.g. relatively loose engagement of the coupling parts and reduced thermal dimensional resistance and diesel oil resistance.

SUMMARY OF THE INVENTION

It is an object of the present invention to provide an improved plug-in coupling which provides for a vibrational decoupling feature not only transverse to the axis of the plug-in coupling but also in any other directions.

It is a further object of the present invention to provide an improved plug-in coupling which ensures a tight fit of the engaged coupling parts.

A further important feature of the present invention is the provision of a plug-in coupling of the type set forth, which is of increased chemical resistance and thermal dimensional resistance.

In accordance with the present invention the intermediate annular wall of the female coupling part is not formed as a simple conical guide portion but is of an undulated or corrugated profile in an axial cross section. Preferably the undulated or corrugated profile comprises a single axially directed annular bulge of the intermediate annular wall. The undulated or corrugated profile of the intermediate annular wall provides for increased resiliency not only in radial but also in axial directions. As a result the female coupling part may perform vibrational decoupling compensating movements both in axial and radial directions and therefore in any intermediate directions, i.e. three-dimensional compensating movements in space. Accordingly, the plug-in coupling of the invention shows substantially improved vibrational decoupling characteristics.

This allows to make the female coupling part of a more rigid material. While it is still possible to make the female coupling part of a relatively soft inter-linked elastomeric material, in particular a rubber or caoutchouc material, the female coupling part preferably is made of elastomeric material based on polyester of high chemical resistance and high thermal dimensional resistance. Preferred materials are polybutylene terephthalate (PBT) and polyethylene terephthalate (PET). These materials are of significantly higher Shore hardness than inter-linked thermoplastic elastomeric materials such as rubber or caoutchouc. As a result thereof the plug-in coupling of the invention may be designed so as to be of increased resistance to disengagement therof in order to reduce the risk of inadvertent disengagement of the coupling. Apart from their increased chemical resistance these materials are particularly well suited high precision injection molding, finishing operations on the female coupling part are not required. The high thermal resistance (150° C. and more) of these materials enable the use of the plug-in coupling also in thermally critical applications such as in close relationship to an automotive combustion engine.

In accordance with a preferred embodiment of the invention webs interconnect the internal and external walls of the bulge of the intermediate annular wall for stiffening the bulge in an axial direction. The webs prevent axial deflection of the annular bulge of the intermediate wall.

The intermediate annular wall including its undulated profile may be of uniform wall thickness. Preferably, however, the intermediate annular wall of the female coupling part is of a wall thickness which increases in a radially outwards direction. As a result thereof radial vibrational decoupling compensating movements of the female coupling part are compensated in a uniformly increasing manner.

BRIEF DESCRIPTION OF THE DRAWINGS

For the purpose of facilitating an understanding of the invention, there are illustrated in the accompanying drawings preferred embodiments thereof, from an inspection of which when considered in connection with the following description, the invention, its construction and operation, and many of its advantages should be readily understood and appreciated.

DESCRIPTION OF THE PREFERRED EMBODIMENTS

Figure 1:
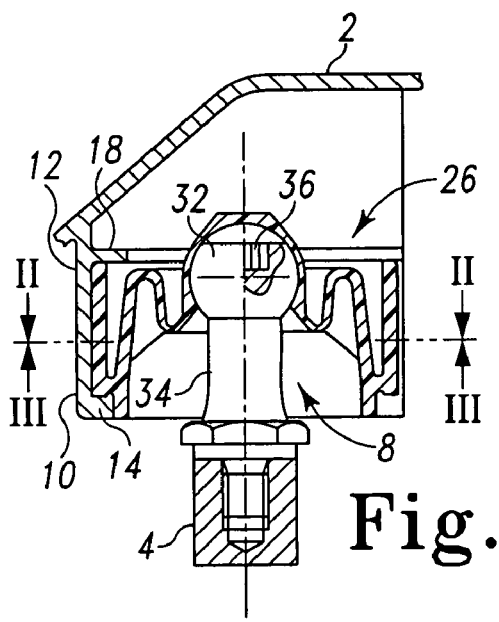
FIG. 1 is a longitudinal cross-section of a plug-in coupling of the invention in its mounted and engaged position.
Figure 9:
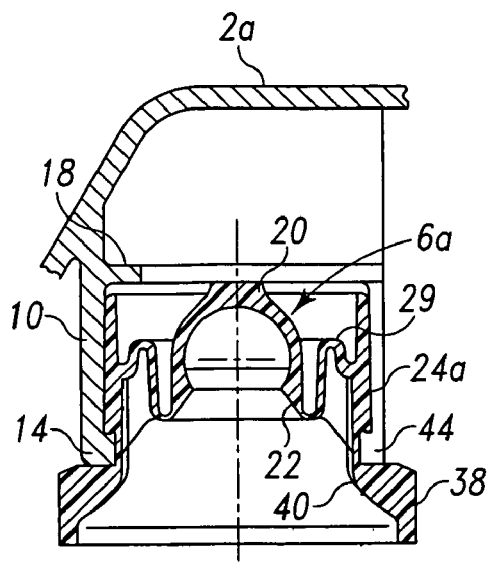
FIG. 9 is a longitudinal cross-section, similar to FIG. 1, of a modified embodiment of the female coupling part, not showing the male coupling part.

With reference to FIG. 1, the plug-in coupling shown therein is intended to removably interconnect a first structural member 2 (2a in FIG. 9) and a second structural member 4 which may be e.g. a removable cover and, respectively, a frame of an automotive vehicle (not shown). The plug-in coupling comprises a female coupling part 6 and a male coupling part 8. The female coupling part 6 is adapted to be inserted into a socket 10 of the structural member 2, and the male coupling part 8 is adapted to be secured to the structural member 4.

Figure 2:
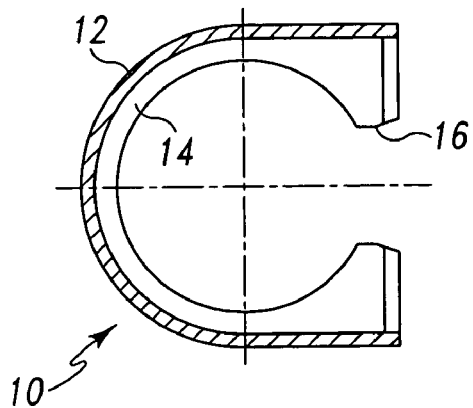
FIGS. 2 and 3 are sectional views taken generally along the line II—II and, respectively, III—III in FIG. 1.
Figure 5:
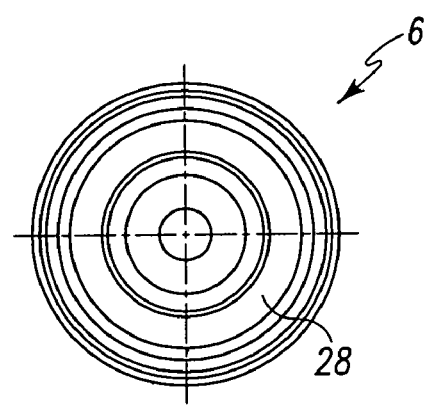
FIG. 5 is a top view of the female coupling part in FIG. 4.
Figure 3:
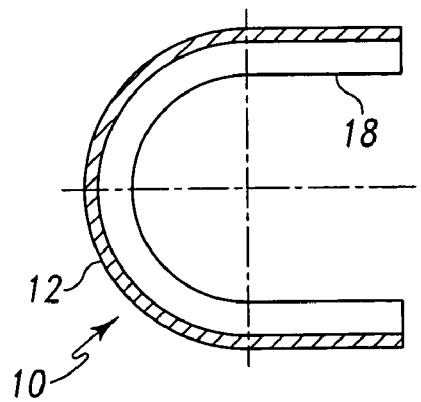

With further reference to FIGS. 2 and 3, the socket 10 is integral with the structural member 2 and comprises a laterally open, semi-cylindrical peripheral wall 12. At its (in FIG. 1) lower axial end the peripheral wall 12 has a radially inwards projecting integral collar 14. The collar 14 has, on one side thereof, a slot-shaped opening 16 allowing for the female coupling part 6 to be laterally inserted in the socket 10 as will be explained in more detail below (FIG. 2). Adjacent to its upper axial end the peripheral wall 12 is provided with a horse shoe shaped collar 18 (FIG. 3).

Figure 4:
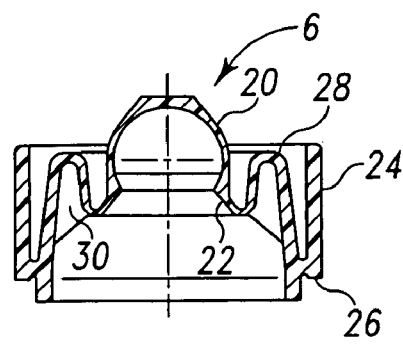
FIG. 4 is a longitudinal cross-section of the female coupling part of the plug-in coupling in FIG. 1.

As shown in FIGS. 1 and 4, the female coupling part 6 comprises a downwardly open ball-shaped cup 20, an intermediate wall 22 integrally connected to the ball-shaped cup 20 at the open end thereof, and a tubular wall 24 integrally connected to the intermediate wall 22 and being of substantially cylindrical shape in the embodiment as shown. The tubular external wall 24 is provided at its (in FIG. 4) lower axial end with a rim 26 comprising an annular shoulder defined by a short axial extension of the intermediate wall 22 and being in engagement with the collar 14 of the socket 10 when the female part 6 is inserted into the socket 10. The upper rim of the external wall 24 of the female part 6 is supported against and engages the upper collar 18 of the socket 10.

The intermediate wall 22 interconnects the ball-shaped cup 20 and the tubular external wall 24. A short conical portion integrally connected to the ball-shaped cup 20 serves as a guide portion for insertion of the male coupling part 8. As shown in FIGS. 1, 4 and in particular in FIG. 13, the intermediate wall 22, in the axial cross-section, is of an undulated or corrugated profile which is defined by a single annular bulge 28 in the embodiments as shown. The annular bulge 28 is axially directed in an upward direction (in FIG. 13) and is of bellows shape. The internal wall 28a of the bulge 28 smoothly merges into the conical portion of the ball-shaped cup 20, and the external wall 28b is integrally connected to the lower axial end of the tubular external wall 24.

Figure 6:
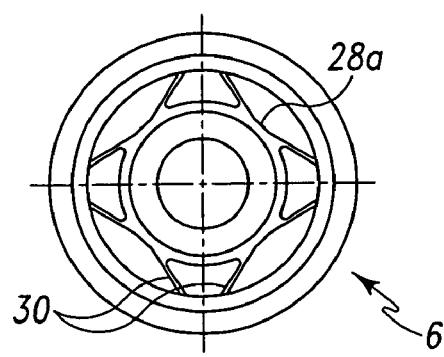
FIG. 6 is a bottom view of the female coupling part in FIG. 4.
Figure 10:
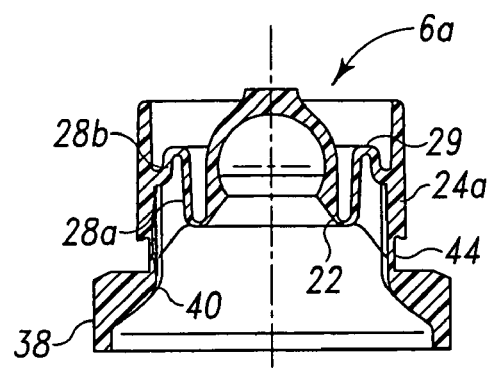
FIG. 10 is a longitudinal section of the female coupling part of the plug-in coupling in FIG. 9.
Figure 8:
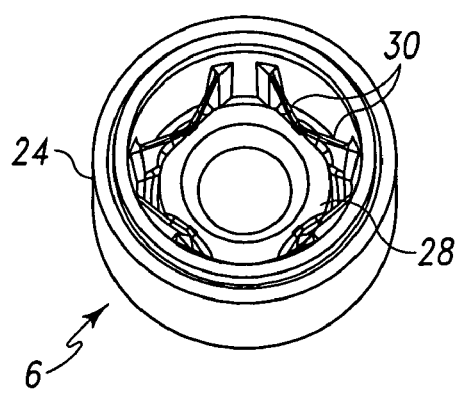
FIG. 8 is a perspective bottom view of the female coupling part in FIG. 4.
Figure 13:
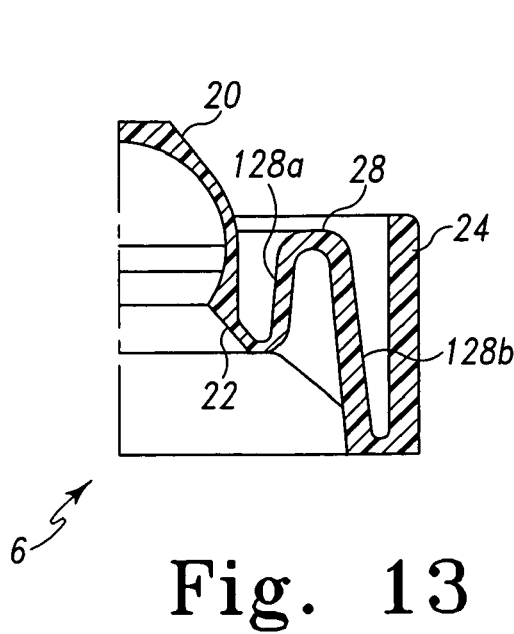
FIG. 13 is an enlarged partial view of the female coupling part on one side of the midline as shown in FIG. 4.
Figure 14:
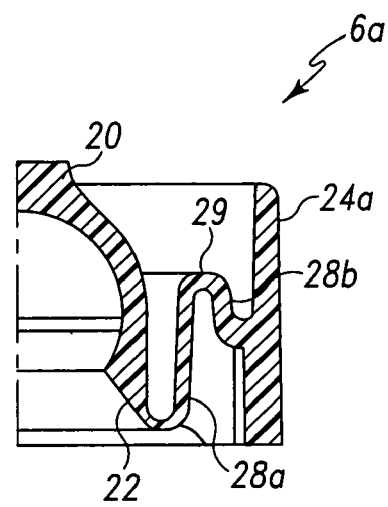
FIG. 14 is an enlarged partial view of the female coupling part on one side of the midline as shown in FIG. 10 and FIG. 12.

As shown in FIGS. 10 and 14, the interior of the bulge 28 is provided with a plurality of webs 30 which interconnect the internal wall 28a (128a of FIG. 13) of the bulge 28 and the external wall 28b (128b of FIG. 13) thereof. As shown in particular in FIGS. 6 and 8, the webs 30 extend substantially tangentially to the internal wall 28 of the bulge 28. The webs 30 are arranged in pairs such that the webs 30 of any pair thereof are inclined in opposite circumferential directions. The webs 30 prevent axial deflections or deformations of the bulge 28 as will be explained in more detail below.

As shown in FIG. 1, the male coupling part 8 comprises a ball-shaped head 32 and a fixing portion 34 integrally connected thereto and securing the male coupling part 6 to the structural member 4. In the embodiment as shown, the fixing portion 34 is connected to the structural member 4 by threaded connection means, with the ball-shaped head 32 being provided with a recess 36 for engagement of a respective tool (not shown). However, the fixing portion 34 may be secured to the structural member 4 in any other suitable manner and even may be integrally formed therewith.

As mentioned above, the female coupling part 6 is preferably made of elastomeric material based on polyester, in particular polybutylene terephthalate (PBT) or polyethylene terephthalate (PET). While these materials are resiliently deformable, they are of relatively high Shore hardness and excellent thermal dimensional resistance (150° C. and more). Furthermore, they are of good chemical resistance, in particular diesel oil resistance. However, other materials such as inter-linked elastomeric materials, in particular rubber/caoutchouc may be also used as already mentioned above. The male coupling part 8 is made for example of plastic material reinforced by a filler, or of metallic material.

For inserting the female coupling part 6 into the socket 10 of the structural member 2 the female coupling part 6 is slided laterally into the socket 10 through the open side of the peripheral wall 12 of the socket 10. Due to the relatively high hardness of the material of the female coupling part 6 it would not simply be possible to snap the female coupling part 6 snap into a closed annular collar 14 of the socket 10. Therefore, in the embodiment as shown the collar 14 is provided with the opening 16 (FIG. 2) through which the female coupling part 6 can be inserted into the socket 10 when the female coupling part 6 is manually compressed. When assembled the female coupling part 6 is positively retained between the lower collar 14 and the upper collar 18 of the socket 10.

When the female part 6 has been mounted to its associated structural member 4 in the above described manner, engagement of the plug-in coupling requires merely to insert the male coupling part 8 axially into the female coupling part 6 by relative movement between the structural members 2 and 4 so as to snap the ball-shaped head 32 into the ball-shaped cup 20. The ball-shaped head 32 will then be surrounded and engaged by the ball-shaped cup 20 over more than half of its outer surface.

Figure 15:
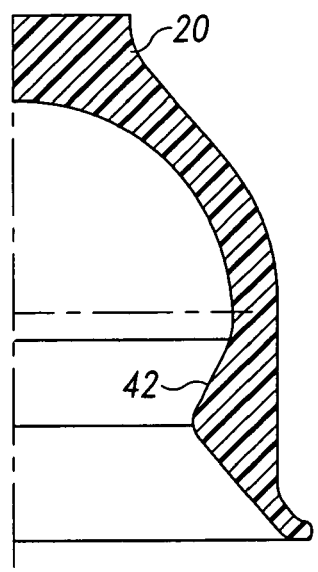
FIG. 15 is an enlarged partial view of the ball-shaped cup of the female coupling part of a plug-in coupling of the invention.
Figure 16:
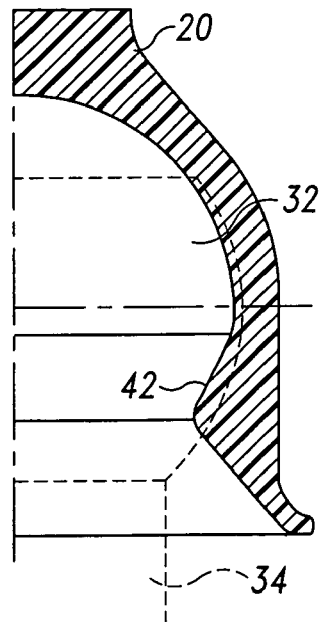
FIG. 16 is an enlarged partial sectional view similar to FIG. 15, with the male coupling part being indicated by dash dotted lines.

As shown in FIG. 15 and in particular FIG. 16, the ball-shaped head 32 is overdimensioned with respect to the ball shaped cup 20 for a predetermined amount. The amount of the overdimensioning is such that the ball-shaped head is seated within the ball-shaped cup without any play therebetween even when the ball-shaped head and the ball-shaped cup are subject to different thermal expansions. As shown in FIGS. 15 and 16, the internal surface of the ball-shaped cup 20 has, at its open end, a conical portion 42 which is inclined in a radially inwards direction with respect to a virtual extension of the spherical surface of the ball-shaped cup 20. As a result thereof the ball-shaped cup 20 exerts an increased retention force upon the ball-shaped head 32. In view thereof and also in view of the above described material of the ball-shaped cup, relatively high demounting forces for disengaging the plug-in coupling are required so that the plug-in coupling is extremely safe against inadvertent disengagement thereof.

When the plug-in coupling is in its mounted and assembled position, it provides, due to its geometrical structure and the used material, for vibrational decoupling of the structural members 2 and 4, and this both in axial and radial directions and also in any intermediate directions. The compensating movements of the plug-in coupling enabling the vibrational decoupling effect are enabled by the undulated intermediate wall 22 of the female coupling part 6. The annular bulge 28 of the intermediate wall 22 provides for the necessary resiliency of the female coupling part 6 in axial directions. The webs 30, which prevent deflection and rolling of the bulge 28, accommodate compensating movements in radial directions due to their tangential structure. Furthermore, the webs 30 are sufficiently resilient to recover, i.e. to re-center, the bulge after having performed compensating movements.

As shown in FIGS. 1, 4 and in particular FIG. 13 in an exaggerated manner, the intermediate wall 22 including the bulge 28 is of a wall thickness which increases in a radially outwards direction. As a result the intermediate wall 22 including the bulge 28 is of a spring rate similar to the spring rate of a spring the hardness of which increases in a radially outward direction. Therefore, the resistance of the coupling against radial compensating movements increases in radially outwards directions so that vibrational decoupling movements are accommodated and compensated in radial directions by uniformly increasing forces.

The used material (elastomeric material based on polyester) is particularly well suited for injection molding so that the intermediate wall 22 including the bulge 28 can be made extremely thin without any finishing operations on the injection molded female coupling part. Due to its chemical and thermal dimensional resistance the used material can be applied also in critical areas such as in areas closely adjacent to the combustion engine of an automotive vehicle as already explained above.

The modified embodiment of the female coupling part 6a shown in FIGS. 9 to 11 and 14 is substantially similar with respect to its structure and function to the female coupling part of the above described embodiment. A difference is that in the embodiment of FIGS. 9 to 11 and 14 the outer diameter of the female coupling part 6a and therefore the radial spacing between the ball-shaped cup 20 and the tubular peripheral wall 24a is smaller than in the preceding embodiment. This results in a modified geometry of the bulge 29, compared to bulge 28 described above, insofar as its external wall 28b does not extend to the lower axial end of the tubular external wall 24a but rather merges into the tubular external wall 24a in an intermediate area thereof as shown also in FIG. 14. While the bulge 28 of the embodiment of FIGS. 4 to 6 and 13 in an axial cross-section thereof is greater than a half-wave, the bulge 29 of the embodiment of FIGS. 9 to 11 and 14 is smaller than a half-wave. The functional behavior thereof, however, remains the same.

A further difference is that in the embodiment of FIGS. 9 to 11 and 14 longitudinally extending stiffening ribs 40 are provided on the internal side of the tubular external wall 24a. The stiffening ribs 40 extend from the position where the intermediate wall 22 merges into the tubular external wall 24a to the axial end of the tubular external wall 24a. The stiffening ribs 40 allow an axial extension of the tubular external wall 24 to be of extremely thin wall thickness.

Furthermore, in the embodiment of FIGS. 9 to 11 and 14 an annular, radially projecting extension 38 is provided at the lower axial end of the female coupling part 6a. Between the lower edge of the tubular external wall 24a and the annular extension 38 there is provided an annular groove 44 adapted to snappingly receive the lower collar 14 of the socket 10. This provides for the female coupling part to be positively retained within the socket 10 even though the upper edge of the tubular external wall 24a does not engage the upper collar 18 of the socket 10.

Figure 12:
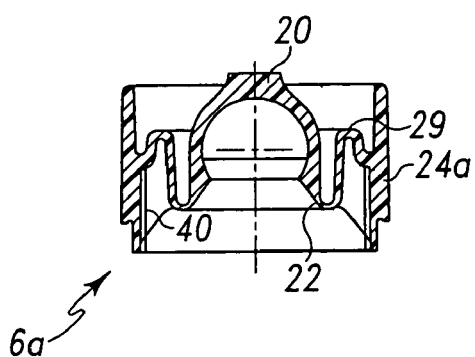
FIG. 12 is a longitudinal cross-section of a further embodiment of the female coupling part.
Figure 11:
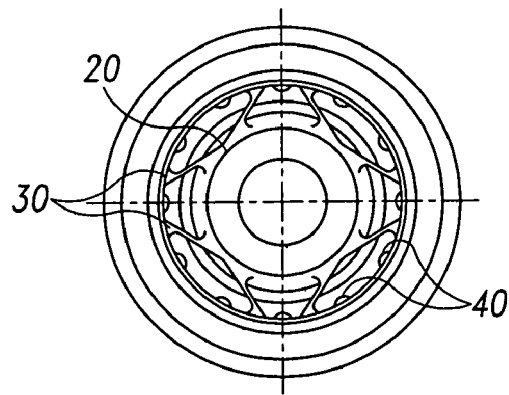
FIG. 11 is a bottom view of the female coupling part of FIG. 10.
Figure 7:
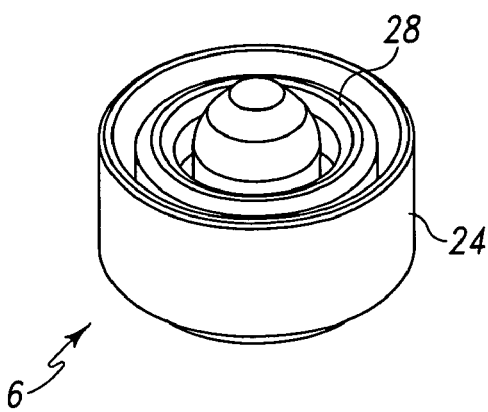
FIG. 7 is a perspective top view of the female coupling part in FIG. 4.

The embodiment of the female coupling part 6b shown in FIG. 12 is similar to the embodiment of FIGS. 9 to 11 and 14, wherein like components have been designated with like numerals, except that the annular extension 38 has been dispensed with. Positive retention of the female coupling part within the socket 10 must therefore be obtained in the manner shown in FIG. 1. Otherwise operation of the female coupling part 6 in FIG. 12 is the same as that of the preceding embodiments.

We claim:

1. A plug-in coupling for removably interconnecting a first structural member and a second structural member, comprising:

a resiliently deformable female coupling part adapted to be inserted into a socket at said first structural member such that the female coupling part is retained therein, said female coupling part comprising a ball-shaped cup, a conical portion integral with said ball-shaped cup and serving as a guide portion, an intermediate annular wall integral with said conical portion, and a tubular external wall integral with said intermediate annular wall, said tubular external wall surrounding at least a part of the ball-shaped cup in spaced relation thereto, and the tubular external wall engaging a peripheral wall of said socket when said female coupling part has been inserted into said socket, and a male coupling part comprising a ball-shaped head and a fixing portion for securing said male coupling part to said second structural member, said intermediate annular wall of said female coupling part, in an axial cross-section thereof, being of an undulated profile at least in a certain area thereof, wherein said undulated profile comprises a single axially directed annular bulge of said intermediate annular wall, said bulge having internal and external walls and webs extending therebetween for stiffening said bulge in an axial direction.

2. The plug-in coupling of claim 1 wherein said webs extend substantially tangentially to said internal wall of said bulge.

3. The plug-in coupling of claim 2 wherein said webs are arranged in pairs such that the webs of any pair thereof are inclined in opposite circumferential directions.

4. The plug-in coupling of claim 1 wherein said annular bulge is integrally connected to said tubular external wall of said female part adjacent an axial end of said tubular external wall.

5. The plug-in coupling of claim 1 wherein said annular bulge is integrally connected to said tubular external wall of said female part in an intermediate area of said tubular external wall.

6. The plug-in coupling of claim 5 wherein longitudinally extending stiffening ribs are provided at an internal surface of said tubular external wall of said female coupling part and extend from said intermediate area to an axial end of said tubular external wall of said female part.

7. The plug-in coupling of claim 1 wherein said intermediate annular wall of said female coupling part is of uniform wall thickness.

8. The plug-in coupling of claim 1 wherein said annular intermediate wall of said female coupling part is of a wall thickness increasing in a radially outwards direction.

9. The plug-in coupling of claim 1 wherein said ball-shaped head of said male coupling part is overdimensioned with respect to the ball-shaped cup of the female coupling part so as to provide for the ball-shaped head to be received within the ball-shaped cup without any play even when the ball-shaped head and the ball-shaped cup are subject to different thermal expansions.

10. The plug-in coupling of claim 9 wherein said ball-shaped cup has an internal spherical surface merging into the conical portion at an open end thereof, said conical portion extending radially inwards with respect to said spherical surface so as to provide for increased retention forces acting upon said ball-shaped head when the plug-in coupling is in a closed condition.

11. The plug-in coupling of claim 1 wherein said female coupling part is made of a thermoplastic elastomeric material based on a polyester having chemical resistance and thermal dimensional resistance.

12. The plug-in coupling of claim 11 wherein said elastomeric material is polybutylene terephthalate or polyethylene terephthalate.

13. The plug-in coupling of claim 1 wherein said female coupling part is made of cross-linked elastomeric material.

14. A female coupling part for a plug-in coupling for removably inter-connecting a first structural member and a second structural member, said female coupling part being resiliently deformable so as to be adapted to be inserted into a socket at said first structural member for positive retention therein, said female coupling part comprising a ball-shaped cup, a conical portion integral with said ball-shaped cup and serving as a guide portion, an intermediate annular wall integral with said conical portion, and a tubular external wall integral with said intermediate annular wall, said tubular external wall surrounding at least a part of the ball-shaped cup in spaced relation thereto, and the tubular external wall engaging a peripheral wall of said socket when said female coupling part has been inserted into said socket, said intermediate annular wall of said female coupling part, in an axial cross-section thereof, being of an undulated profile at least in a certain area thereof, wherein said undulated profile comprises a single axially directed annular bulge of said intermediate annular wall, said bulge having internal and external walls and webs extending therebetween for stiffening said bulge in an axial direction.

15. A socket and a female coupling part, in combination, for a plug-in coupling for removably interconnecting a first structural member and a second structural member, said female coupling part being resiliently deformable so as to be adapted to be inserted into said socket to be provided at said first structural member for positive retention therein, and comprising a ball-shaped cup, a conical portion integral with said ball-shaped cup and serving as a guide portion, an intermediate annular wall integral with said conical portion, and a tubular external wall integral with said intermediate annular wall, said tubular external wall surrounding at least a part of the ball-shaped cup in spaced relation thereto, and the tubular external wall engaging a peripheral wall of said socket when said female coupling part has been inserted into said socket, said intermediate annular wall of said female coupling part, in an axial cross-section, being of an undulated profile at least in a certain area thereof, wherein said undulated profile comprises a single axially directed annular bulge of said intermediate annular wall, said bulge having internal and external walls and webs extending therebetween for stiffening said bulge in an axial direction.

16. The socket and female coupling part of claim 15 wherein said peripheral wall of said socket is laterally open and has an axial end provided with an annular collar extending radially inwards for supporting a rim of said tubular external wall of said female coupling part and being provided with a lateral opening for inserting said female coupling part into the socket.

* * * * *